United States Patent [19]

Kakinuma et al.

[11] 4,091,064
[45] May 23, 1978

[54] PROCESS FOR PRODUCING ELECTRIC CABLE INSULATED WITH CURED POLYOLEFIN

[75] Inventors: Mitsuo Kakinuma; Isoji Motegi; Yasuo Matsui, all of Kumagaya; Masatake Matsui, Amagasaki; Masaaki Ohtsuju, Osaka; Kiyoshi Takahashi; Takeo Fukuda, both of Amimachi, all of Japan

[73] Assignees: Dainichi Nihon Densen Kabushiki Kaisha; Mitsubishi Petrochemical Co., Ltd, both of Japan

[21] Appl. No.: 689,348

[22] Filed: May 24, 1976

Related U.S. Application Data

[63] Continuation of Ser. No. 499,275, Aug. 21, 1974, abandoned.

[30] Foreign Application Priority Data

Aug. 22, 1973 Japan ................................. 48-94059

[51] Int. Cl.² .............................................. B29F 3/10
[52] U.S. Cl. .................................... 264/174; 264/236; 264/347; 425/97; 425/113
[58] Field of Search ................. 264/174, 169, 176 R, 264/236, 347; 425/97, 107, 113–115

[56] References Cited

U.S. PATENT DOCUMENTS

| | | | |
|---|---|---|---|
| 2,537,977 | 1/1951 | Dulmage | 264/169 |
| 2,666,947 | 1/1954 | Shaw | 264/174 |
| 2,688,768 | 9/1954 | Rayburn | 425/113 |
| 2,692,406 | 10/1954 | Rhodes et al. | 264/176 R |
| 2,693,007 | 11/1954 | Rhodes | 264/169 |
| 2,742,669 | 4/1956 | Rhodes | 264/236 |
| 3,054,142 | 9/1962 | Hinderer et al. | 264/169 |
| 3,219,733 | 11/1965 | Harris et al. | 264/176 R |
| 3,229,012 | 1/1966 | Garner | 264/174 |
| 3,354,243 | 11/1967 | Dodge | 264/25 |
| 3,868,436 | 2/1975 | Ootsuji et al. | 264/174 |

FOREIGN PATENT DOCUMENTS

| | | | |
|---|---|---|---|
| 694,382 | 9/1964 | Canada | 425/97 |
| 2,308,593 | 8/1973 | Germany | 425/107 |
| 659,480 | 10/1951 | United Kingdom | 425/97 |

*Primary Examiner*—Jeffery R. Thurlow
*Attorney, Agent, or Firm*—Armstrong, Nikaido, Marmelstein & Kubovcik

[57] ABSTRACT

Electric cables insulated with a cured polyolefin and having high electrical breakdown strength are produced, in each instance, by applying, an insulating layer of polyolefin containing a curing agent onto a conductor by means of an extruder, forming and hot-curing said layer by means of a long-land die, simultaneously applying a specific forming coagent to a tapered portion of the long-land die, and cooling the resulting hot-cured insulating layer formed on the conductor in a cooling zone.

3 Claims, 2 Drawing Figures

U. S. Patent May 23, 1978 4,091,064
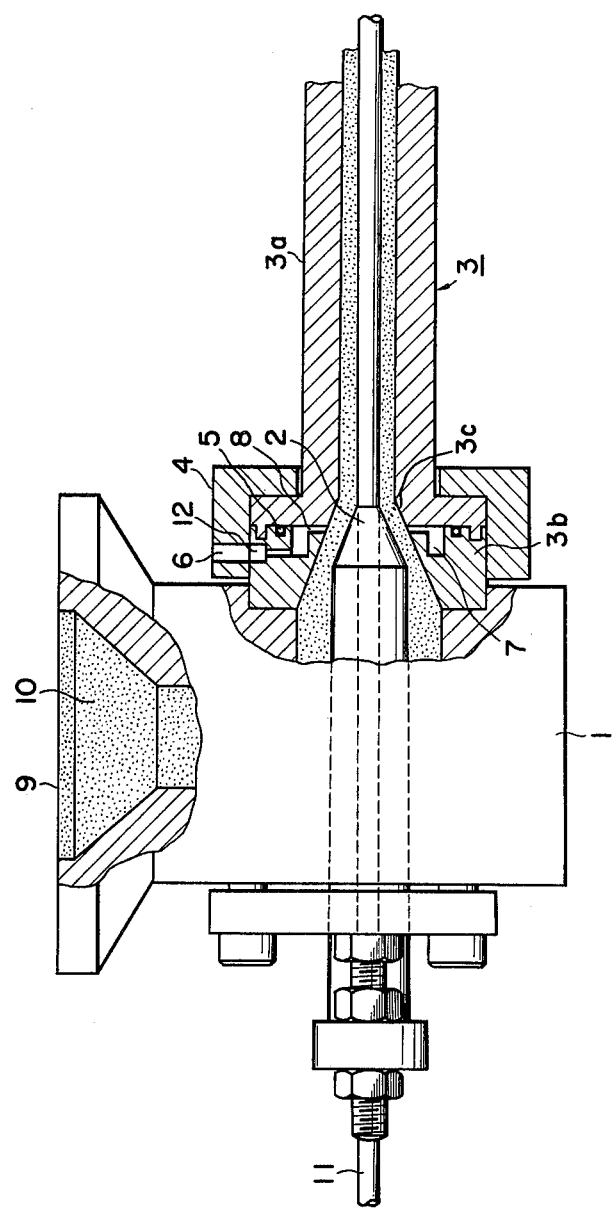

PROCESS FOR PRODUCING ELECTRIC CABLE INSULATED WITH CURED POLYOLEFIN

This is a continuation of application Ser. No. 499,275, filed Aug. 21, 1974, now abandoned.

BACKGROUND OF THE INVENTION

This invention relates to improvements in a new process for producing electric cables developed by the present inventors.

The new process referred to above is a novel process for producing electric cables having an insulating layer of a cured polymeric material by using a horizontal forming and curing zone and is operable at higher speeds than the conventional V.C.V. process, the cured polymeric insulating layer being free from voids.

According to the new process, a curable polymeric material supplied onto a conductor by an extruder or the like is formed and hot-cured by a long-land die, which is from about 1 to 50 m or more in length. To the inner surface of this die, a specific forming coagent is continuously applied, and the hot-cured insulating layer formed on the conductor is then cooled with a high-pressure cooling fluid in a cooling zone attached to the exit of the long-land die. Usable as the forming coagent in this process are those coagents described in the pending application of M. Fuwa et al, Ser. No. 212,049, filed Dec. 27, 1971, now U.S. Pat. No. 3,928,525, issued Dec. 23, 1975 and assigned to the applicants' assignees.

Although the above described new process for producing cables is satisfactory in the case of producing thin wall insulating cables or cured rubber insulating cables, serious difficulties, such as roughening of the surface of the resultant cables or lowering of the breakdown voltage thereof, tend to occur when thick wall, cured-polyolefin insulting cables of voltage rating of 154 KV or 275 KV are to be produced with the use of a curable polymeric material such as polyolefin containing a curing agent, and in some cases the production thereof must be interrupted because of constantly increasing severity of the roughness of the surface of the cable.

As a result of intense studies directed toward clarifying the reason for the above described difficulties, we have found that the melted uncured polyolefin undergoes a viscous flow, which is sharply different from rubber-like compositions undergoing a plug flow, and that when the thick wall insulating cables are produced, the thick layer of polyolefin flowing through the long-land die tends to undergo an abrupt change in direction within a portion of the die ranging from the tapered portion to the land portion. For these reasons, the flowing speed of a part of the flowing layer of polyolefin is slackened along the inner surface at the entrance of the land portion. The slackened layer of the polyolefin is scorched in a very short period and the inner surface of the land portion is encrusted with scorched polyolefin. The scorched polyolefin destroys the molding ability of the land portion, and the outer surface of the cable thus produced is caused to be damaged by the scorched polyolefin on the land portion, and the breakdown voltage of the cable is thereby lowered.

Frequently, the scored polyolefine hampers and further slackens the flow of polyolefin layer near the inner surface of the land portion, the scorching of polyolefin thereby being accelerated, and the production of the cable is ultimately interrupted.

The creation of the scorched polyolefin on the inner surface of land portion depends much on the position at which the forming coagent is introduced into the inner surface of the die. In the previously described new process, the forming coagent has been supplied to the land portion of the long-land die. In this improved process, however, the forming coagent is supplied to the tapered portion of the long-land die, whereby the slackening in the flow and scorching of a part of the polyolefin are thereby prevented, and large-sized cables insulated with a thick wall of cured polyolefin and of high quality and high breakdown voltage can be produced continuously for a long period of time.

SUMMARY OF THE INVENTION

The present invention has been accomplished on the basis of the novel findings described above.

An object of this invention is to provide an improved process for producing electric cables with a long-land die.

Another object of the invention is to provide an improved process and apparatus whereby large-sized cables insulated with a thick wall of cured-polyolefin of a high quality and high breakdown voltage can be produced in a stable manner for a long period of time with polyolefin containing a curing agent used as the curable polymeric material.

BRIEF DESCRIPTION OF THE DRAWING

In the accompanying drawing, the single FIGURE is a side view, partly in longitudinal section, showing an apparatus according to the present invention for producing cables having a thick insulating layer made of a cured-polyolefin.

DETAILED DESCRIPTION OF THE INVENTION

The curable polymeric material to be used in this invention predominantly consists of an polyolefin and further contains a curing agent admixed therewith.

Preferable examples of the polyolefins are polyethylene, polypropylene, polybutene-1 and like poly-α-olefins; and ethylene-vinyl acetate, ethylene-ethylacrylate and like copolymers of poly-α-olefins, especially polyethylene.

Examples of the curing agent to be added to the polyolefin in this invention are those generally used as such and include ditertiary butyl peroxide, tertiary-butylcumyl peroxide, dicumyl peroxide, 1,3-bis-(tertiary-butylperoxy-isopropyl) benzene, 2,5-dimethyl-2,5-di(tertiary-butylperoxy)hexane, 2,5-dimethyl-2,5-di (tertiary-butylperoxy) hexyne-3, 1,1-ditertiary-butylperoxy-3,3,5-trimethylcyclohexane and like dialkyl peroxides.

The curing agent is used in an amount of about 0.1 to 10 parts by weight per 100 parts by weight of the polyolefin. Where desired, the curable polymeric material may further contain a conventional curing accelerator, curing coagent, anti-aging agent, lubricant, pigment, voltage stabilizer, filler, etc..

The present invention will be described below in greater detail with reference to the drawings showing an apparatus suitable for practicing the present process.

In the apparatus for practicing the process according to this invention, a polyolefin compound 10 mixed with a curing agent, which is supplied from a separately provided extruder (not shown), is fed into an extruding head 1 and passed successively through an annular space formed between the inner surfade of the extruder head 1 and a nipple 2 and another annular space formed between the tapered portion $3_c$ and the nipple 2 through which an electric conductor 11 is continuously fed, and thereafter the conductor is coated with said polyolefin compound as will be hereinafter described in more detail.

The number of the extruders to be used may amount to several, for example, three, each as described in the example set forth below, according to the number of polyolefin layers to be coated onto the conductor.

The extruder head (or a cross-head) 1 is provided at a downstream side thereof with a long-land die 3 which in turn comprises a first member $3_a$ and a second member $3_b$ forming a tapered portion $3_c$ in the inner bore when the two members are assembled together as described hereinafter in more detail.

Thus, the polyolefin compound 10 mixed with a curing agent fed into the annular passage around the extruding core 2 is passed into the tapered bore portion $3_c$ of the long-land die 3 and then to the space around the conductor 11 continuously supplied through the nipple 2 at a constant speed. The conductor 11 thus coated by the polyolefin compound 10 which is cured in the long-land die 3 is then passed into a pressurized cooling device (not shown) connected directly to the outlet end of the long-land die 3. The entire length of tapered portion $3_c$, that is, the distance between its upstream end and its downstream end, is usually about 50 mm to about 200 mm.

The first member $3_a$ of the long-land die 3 has at its upstream end a flange portion which is forced into contact with the downstream side surface of the second member $3_b$ fixed to the main body of the extruding head 1 by a die holder 4. An annular gasket 5 is disposed between the contacting surfaces of the first and second members $3_a$ and $3_b$ so that a pressure-tight seal is obtained between the two members.

Radially inwardly of the annular gasket 5, an annular reservoir 7 and annular gap 8 are provided between the confronting surfaces of the first and second members, and a forming coagent 12 is introduced through a hole 6 provided in the die holder 4, the annular reservoir 7, and the annular gap 8, to the tapered bore portion $3_c$ of the long-land die 3. The forming coagent thus supplied to the taper portion spreads all over the inner surface of long-land die located downstream of the gap to facilitate the smooth passing of the conductor 11 with polyolefin layer thereon.

The reservoir 7 is formed by an annular recess formed in the surface of the second member $3_b$ and by the confronting side surface of the first member $3_a$ at a position inward from the annular gasket 5, and the annular gap 8 is formed between the confronting surfaces of the two members radially inwardly from the annular reservoir 7. The gap 8 is selected in a range of from about 0.005 mm to about 1 mm, preferably from about 0.01 mm to about 0.5 mm. The forming coagent is described in copending application Ser. No. 212,049 by M. Fuwa et al, filed Dec. 27, 1971, now U.S. Pat. No. 3,928,525. The forming coagent must satisfy the following four requirements.

(1) Having a viscosity of 0.5 to 3,000 centistokes at 235° C.

(2) Be not more than 100 mg./cm.$^2$ in its absorption ratio to the curable polymeric material at 150° C. for 45 hours.

(3) Be free of gelation when in contact with the organic peroxide in the curable polymeric material.

(4) Not be boiled during curing of the curable polymeric material.

The above-mentioned absorption ratio is determined by immersing a cured sheet (30 mm × 30 mm × 1 mm) made from the curable material to be employed in the forming coagent to be used at 150° C for 45 hours. The sheet is weighed before and after the immersion, and the difference between both weights divided by the total surface area of the sheet before immersion gives the absorption ratio.

Gelation of the coagent under normal operational conditions is determined according to a test which comprises placing a mixture of 10 parts by weight of a forming coagent and 1 part by weight of an organic peroxide in a sealed vessel provided with a mixer, heating the mixture at a rate of about 10° C. per minute up to 235° C, maintaining that temperature for 5 minutes, and subsequently measuring the viscosity ($\eta_1$) of the resultant liquid at 235° C. The original viscosity ($\eta_o$) of the forming coagent itself at 235° C is also measured. The forming coagents, having a ratio of $\eta_1/\eta_o$ lower than 30, are considered not to gel for purposes of the present invention, and it is not expected to form any gelled film on the inner surface of long-land die in a continuous operation for at least several hours. When the organic peroxide is non-volatile, the heat treatment may be carried out in an open vessel. In the above test, it is not always necessary to use the organic peroxide that is actually admixed in the curable material. Other typical peroxides, for example, dicumyl peroxide, can be used without error in determination.

The quantity of the forming coagent supplied into the tapered portion $3_c$ of the long-land die is preferably in a range of from about 0.001 cc to about 0.1 cc per one cm$^2$ of the outer surface of the cables thus produced. Under the action of the forming coagent, the polyolefin composition 10 flows into the long-land die 3 without being slowed or becoming stagnant at the entrance of the long-land die and without being scorched onto the inner surface thereof at that portion, so that the polyolefin composition 10 coated on the electtic conductor 11 is sent along the long-land die with the outer surface thereof contacting smoothly along the inner surface of the long-land die.

The long-land die 3 is heated by any suitable heating device such as an electric heating device, a hot-oil jacket heating device, or the like, so that a temperature in a range of about 200° to about 300° C which is ample for thorough curing of the polyolefin composition is thereby attached. The polyolefin composition covering the conductor is thus cured completely while the covered conductor passes through the long-land die.

The length of the land portion of the long-land die 3 is varied in accordance with the thickness of the composition covering the conductor, the reaction temperature of the curing agent contained in the composition, the designed temperature of the long-land die, and the line speed of the conductor 11. In practice, the length of the land portion of the long-land die is preferably selected in a range of from about 5 m to about 30 m. The land portion of the long-land die 3 may comprise a plurality of shorter pieces of land portions which can be assembled together into a unitary land portion.

The outlet end of the long-land die 3 is connected directly to a pressurized cooling device (not shown) by, for instance, a flange coupling, and the cured insulating layer on the conductor 11 is introduced by the movement of the conductor into the pressurized cooling device at the instant of leaving the long-land die 3. The insulating layer is cooled while it passes through the pressurized cooling device containing a cooling fluid such as water. The pressurized cooling device may be any of those used with cable producing devices such as VCV, CCV, or HCV. The pressure of the cooling fluid is selected at a value at least about 7 kg/cm$^2$, and preferably in a range of from about 10 kg/cm$^2$ to about 30 kg/cm$^2$.

The exact position to which the forming coagent, according to the present invention, is supplied to the taped portion $3_c$ of the long-land die 3 may be selected between the upstream end of the tapered portion to the downstream end of the same portion. However, if the supplying position of the forming coagent is selected at the just downstream end of the tapered portion, no satisfactory result can be obtained. The reason for this is in that the just downstream end of the tapered portion, that is the transition position between the tapered portion to the portion of the land of constant inner diameter, is inherently a position where turbulence of flow of polyolefin tends to occur thereby causing stagnant flow and hence scorching of the polyolefin. And the tendency to turbulent flow is promoted by supplying a forming coagent to that transition point, or the just downstream end.

On the other hand, if the forming coagent is supplied to a position located upstream from the upstream end of the tapered portion, the forming coagent tends to be admixed into the polyolefin composition since turbulence in the flow of polyolefin is also severe at such a position. The admixing of the forming coagent in the pololefin composition tends to give rise to deterioration of the dielectric properties of the polyolefin composition. For the above stated reasons, a preferred position to which the forming coagent is supplied is in a range of from about 10 mm downstream from the upstream end of the tapered portion to about 2 mm upstream from the downstream end of the tapered portion.

In the example shown in the drawing, the forming coagent is supplied through the hole 6 into the annular reservoir 7, and from the reservoir 7 through the annular gap 8 to the inner surface of the tapered portion. However, the last stage of the passage of the forming coagent may further be modified in such a manner that the forming coagent is passed from the annular reservoir 7 to the inner surface of the tapered portion through a porous metal, which a part of the tapered portion of the long-land die 3 is fabricated. Such a porous metal is preferably made of sintered metal granules, the diameter of each granule being in a range of about 10 microns to 150 microns, and the thickness of the porous metal being in a range of about 5 mm to 20 mm.

For a better understanding of this invention, a comparative example and an illustrative example are given below, in which parts and percentages are all by weight. However, it is to be understood that these examples are not intended to limit the scope of the invention.

COMPARATIVE EXAMPLE

At a speed of 0.255 m/min., a stranded conductor having a sectional are of 2,700 mm$^2$ was, continuously passed through an electric cable manufacturing apparatus of the horizontal type comprising a conventional crosshead for simultaneously extruding three layers, a long-land die having one end connected to the crosshead and measuring 130 mm in diameter and 15 m in length, and a cooling apparatus connected to the other end of the die and having a length of 30 m. The long-land die comprised a tapered portion of 25 cm. in length converging in the downstream direction and a land portion of constant inner diameter contiguously adjoining the downstream end of the tapered portion and extending coaxially therefrom in the downstream direction. The long-land die was maintained at 250° C by a heater provided around the long-land die, whilst a forming coagent ("Unilube 75DE-2620," product of Nippon Oils & Fats Co., Ltd., Japan of a viscosity at 235° C of 425c st., absorption ratio to cured polyethylene at 150° C for 45 hours of 0.15 mg/cm$^2$, B. P. above 260° C, which is free of gelation when determined in accordance with the method before mentioned) was continuously supplied to the inner surface of the die at a rate of 40cc/min. from an annular gap (gap distance; 0.08 mm) set in the wall of the land portion at a point 10 cm downstream from the entrance of the land portion.

Through the use of three extruders, a semiconductive composition for shielding the conductor, an insulating composition, and a semiconductive composition for covering the insulating layer as described below were simultaneously extruded from the crosshead onto the conductor in three layers having thicknesses of 1.0 mm, 35.0 mm, and 1.0 mm, respectively. The covering layers were passed through the long-land die and then through the cooling apparatus along with the advancing conductor.

The semiconductive composition for shielding the conductor comprised 100 parts of ethylene-vinyl acetate copolymer (containing 20% of vinyl acetate), 50 parts of carbon black, and 2.0 parts of dicumyl peroxide. The insulating composition comprised 100 parts of polyethylene (density: 0.920, melt index: 1.0, melting point: 113° C as determined according to ASTM D-1238-65T, 2.0 parts of dicumyl peroxide, and 0.2 part of 4,4'-thio-bis(6-t-butyl-m-cresol). The insulation covering composition comprised 100 parts of ethylenevinyl acetate copolymer (containing 20% of vinyl acetate) and 50 parts of carbon black. The cooling apparatus was filled, throughout its entire length, with cooling water at 20° C under a pressure of 18 kg/cm$^2$.

A cured polyethylene insulating cable rated at 275 KV of a length of 90 m was manufactured after 5 hours of the production operation. However, numerous longitudinal scars were found on the outer surface of the insulating coating of the cable, and the average A.C. long-term breakdown strength and average impulse breakdown strength of five specimens of the electric cable thus produced were 28 KV/mm and 65 KV/mm, respectively. (Each of the values of breakdown strength given below is an average value of five specimens).

After a production run of 5 hours, the long-land die was disassembled, and the entrance portion of the land portions was inspected. As a result of the inspection, scorched pieces of polyethylen were found to be adhering on substantially the entire inner surface portion 6 cm or more downstream from the upstream end or entrance of the tapered portion.

EXAMPLE 1

An electric cable was produced in the same manner as in comparative example 1 except that the forming coagent was supplied through an annular gap of 0.08 mm provided at an intermediate position of the tapered portion of a long-land die, whose entire length was 25 cm. After approximately 50 hours of continuous operation, a cable of 765 m and having neat outer surface was obtained.

The electric cable obtained had an A.C. long-term breakdown strength and impulse breakdown strength of 38 KV/mm and 85 KV/mm, respectively. Upon inspection of the disassembled long-land die after the production of cables for 50 hours, no scorched polyethylene was found on the inner surface of the entrance portion of the land portion.

We claim:

1. In a process for producing large-sized thickwalled insulating electric cable including cable of ultra-high voltage rating of 154KV to 275KV comprising the steps of feeding an electric conductor continuously through an extruder head and a long land die having a length of from about 1 meter to 50 meters or more coupled thereto on the downstream side of the extruder head, extruding a polyolefin composition containing a curing agent onto the electric conductor with a liquid forming coagent having a viscosity of 0.5 to 3000 centistokes at 235° C., said forming coagent being simultaneously introduced onto the inner surface of the die, hot-curing the polyolefin layer thus formed on the conductor in the die, and cooling the polyolefin layer thus cured with pressurized cooling fluid, the improvement wherein said forming coagent is applied to the outer surface of the polyolefin layer by continuously supplying the coagent into a converging tapered portion provided in said die on the downstream side of said extruder head and on the upstream side of the long land portion of the die having a constant inner diameter, and the forming coagent being supplied to the tapered portion at a position defined by the range of from about 10mm downstream from the upstream end of the tapered portion to about 2mm upstream from the downstream end of the tapered portion.

2. A process as set forth in claim 1 wherein said forming coagent is of a kind having a viscosity of 0.5 to 3,000 centistokes at 235° C, and an absorption ratio to the polyolefin composition containing a curing agent of not more than 100 mg/cm$^2$ at 150° C when it is brought into contact therewith for a period of 45 hours, being free from gelation when in contact with an organic peroxide in the curable polyolefin composition and not being boiled during curing of the curable polymeric material.

3. A process as set forth in claim 1 wherein said polyolefin is a polyethylene.

* * * * *